Dec. 19, 1967
J. R. SOLUM
3,358,768
CEMENT BASKET
Filed Jan. 20, 1966
2 Sheets-Sheet 1
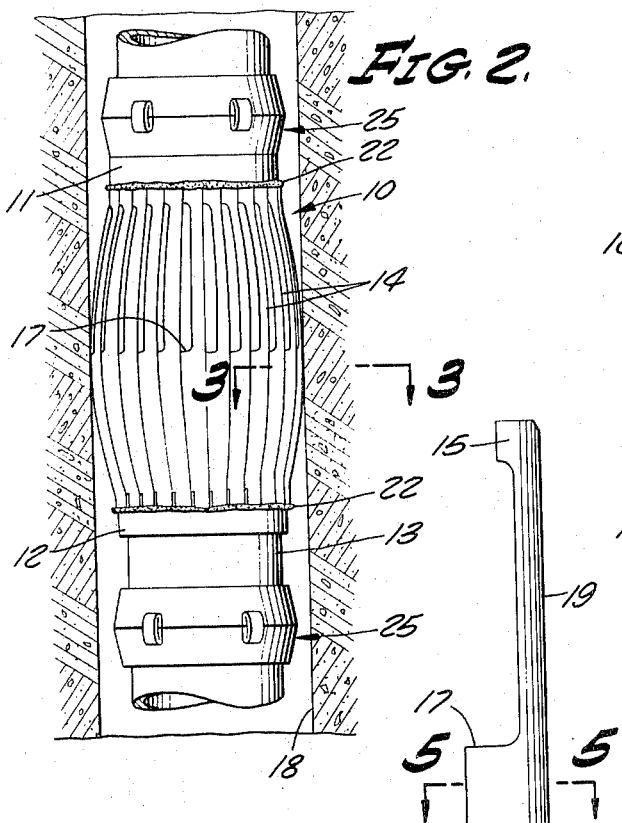
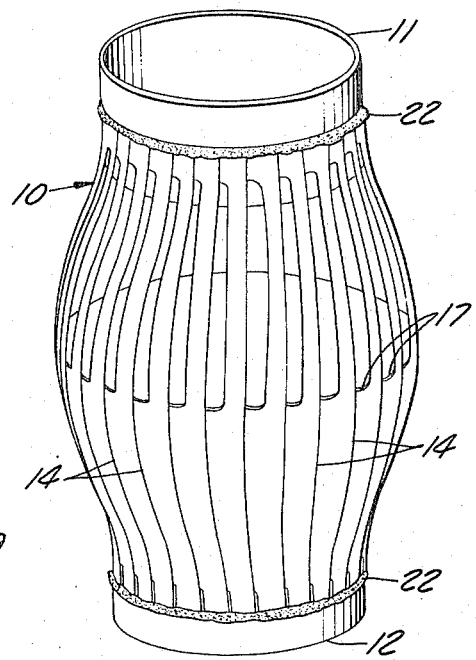
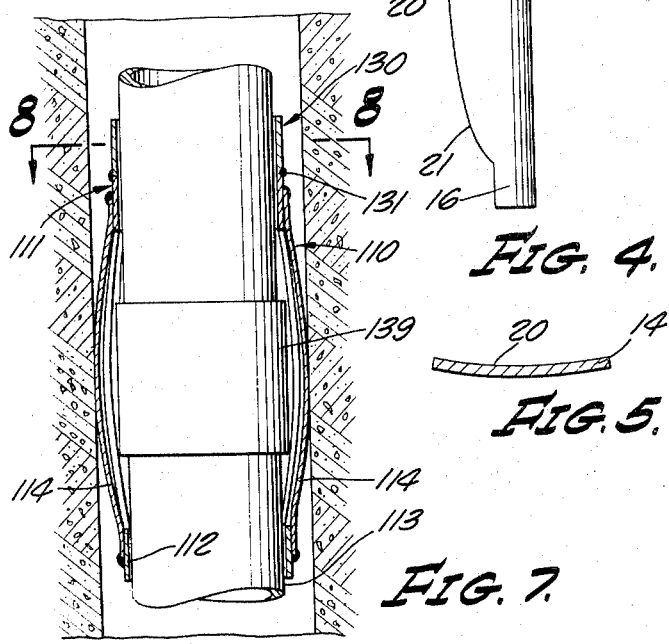
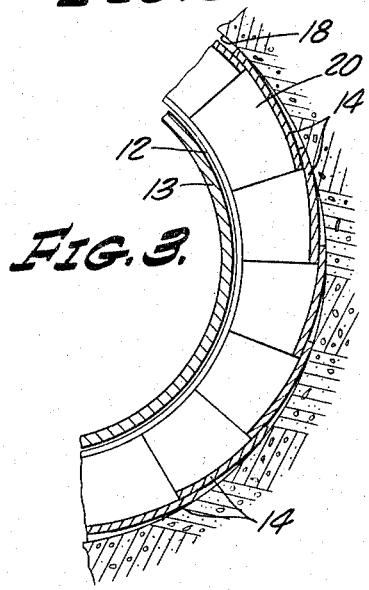
JAMES R. SOLUM
INVENTOR.
BY Lyon & Lyon
ATTORNEYS

JAMES R. SOLUM
INVENTOR.

BY Lyon & Lyon
ATTORNEYS

United States Patent Office 3,358,768
Patented Dec. 19, 1967

3,358,768
CEMENT BASKET
James R. Solum, Los Angeles, Calif., assignor to B & W Incorporated, Torrance, Calif., a corporation of California
Filed Jan. 20, 1966, Ser. No. 521,872
11 Claims. (Cl. 166—202)

This invention relates to devices known as cement baskets used in the completion of oil wells and, in particular, is directed to a unique construction of such a device.

The use of cement baskets in the completion procedure of oil and gas wells is well known. It is conventional practice to cement a well casing or pipe in the well bore at various depths. The cement is placed in the annular space between the well pipe and the wall of the formation to secure and support the well pipe and to seal off certain strata from other parts of the formation. There are various procedures for accomplishing this cementation depending on the situation and conditions. One common practice is to cement the casing beginning at a point above the lower end by pumping the cement out through a port above the lower end and upward in the annular space throughout the area wherein cementation is desired. In using this method it is usually desirable that the cement be kept from flowing downwardly in the annular space below a certain point and this is the point at which a cement basket is located for accomplishing this function. In some cementation operations the cement is pumped upwardly in the annulus and its return downward must be prevented. This function can be accomplished by many forms of cement baskets of the type which will function as a check valve by collapsing while fluid is pumped upwardly passed the device and expanding outwardly to prevent downward flow.

In addition to being theoretically adapted to accomplish these functions, a cement basket must be sufficiently rugged in its design and construction to withstand the extreme forces and conditions encountered. Moreover, since the device is not recoverable its construction cannot be too complex as to render it excessively expensive.

Accordingly by this invention there is provided a unique cement basket of an uncomplicated and rugged design employing a minimum number of different components susceptible to automatic manufacture and which in turn may be readily and inexpensively assembled. Specifically by this invention there is provided a cement basket comprised of a pair of spaced collars joined by a multiplicity of bowed staves extending therebetween, which staves are of a unique shape for readily mounting on the collars and combining to form a basket open at the top and closed at the bottom.

It is an object of this invention to provide a novel form of cement basket comprising simply a pair of collars and a multiplicity of identical staves. A further object is to provide such a device wherein the staves may be inexpensively formed of sheet metal without requiring multiple parts or complex machine operations. A further object is to provide a stave of a shape for conveniently and precisely locating each stave with respect to the other staves during assembly to the collars.

Still another object of this invention is to provide a novel form of cement basket which is resiliently flexible for permitting fluid to flow upwardly pass the device and yet of an extremely strong and rugged construction to prevent downward flow of the cement basket and to resist damage.

A still further object of this invention is to provide a novel form of cement basket susceptible to using various conventional manners and devices for mounting the cement basket on the well pipe. More specifically it is an object of this invention to provide a cement basket which may be pushed or pulled through the well bore by either collar of the cement basket. A still more specific object of this invention is to provide a form of cement basket having one end thereof adapted to be separated for mounting the basket over the conventional casing coupling to locate the cement basket on the casing.

Other and more detailed objects will appear from the following description and the accompanying drawings, wherein:

FIGURE 1 is a perspective view of the preferred form of the cement basket of this invention.

FIGURE 2 is an elevation view of the device shown in FIGURE 1 mounted on a well pipe and positioned within a well bore.

FIGURE 3 is a fragmentary sectional plan view taken substantially on the line 3—3 in FIGURE 2.

FIGURE 4 is an elevation view of one of the staves used in constructing the cement basket of this invention.

FIGURE 5 is a sectional view taken on the line 5—5 in FIGURE 4 showing the arcuate cross-section of the stave.

FIGURE 7 is a sectional elevation of the device of FIGURE 6 positioned in a well bore.

Figure 8:
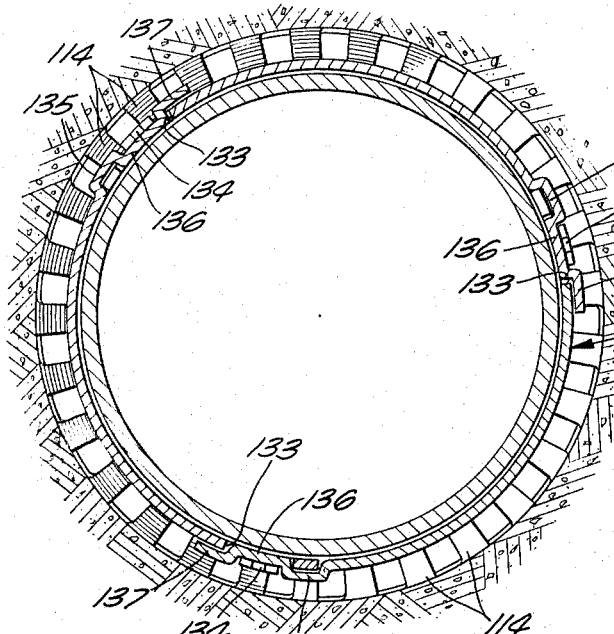
FIGURE 8 is a sectional plan view taken substantially on the line 8—8 in FIGURE 7 and showing the construction of the segmented collar.

Referring now to FIGURES 1 through 5, the preferred form of the cement basket, generally designated 10, of this invention is shown. The cement basket 10 includes a pair of axially spaced collars, the upper collar being designated 11 and the lower collar being designated 12. Collars 11 and 12 are cylindrical and have an inside diameter slightly greater than the outside diameter of the well casing or pipe 13, thereby allowing the cement basket 10 to be slipped on to the well pipe 13. Collars 11 and 12 may be of any convenient manufacture and preferably are metal of a sufficient thickness and width to retain their cylindrical shape during the occasionally rough handling at a rig site whereby no difficulty will be encountered in slipping the basket on to the well pipe. A multiplicity of bows or staves 14 extend longitudinally between the collars 11 and 12 and are mounted on the collars thereby serving to join the collars in spaced relation and completing the cement basket 10.

Each stave 14 is of substantially identical size and shape and one such stave is shown in elevation in FIGURE 4. Each stave is most conveniently made from sheet steel and preferably of a spring quality for having the desired resiliency. As shown in FIGURE 5 the staves are arcuate in cross section which serves to reinforce and strengthen the stave and to enhance its ability to retain the outwardly bowed shape. Each stave 14 is provided with an upper end portion 15 and a lower end portion 16 which are also arcuately shaped for conforming to the outside surface of the collars 11 and 12. End portions 15 and 16 are of substantially identical lateral width for accomplishing the desired spacing in assembly as will appear hereinafter. From the end portions 15 and 16 which are virtually aligned for mounting on the cylindrical surface of the collars, the stave 14 is bowed outwardly to a maximum distance at or very near the midlength of the stave which is at approximately the stepped portion 17. The staves 14 are bowed outwardly a predetermined distance which is dependent on the relationship between the diameter of the well pipe 13 and the well bore 18 whereby the staves will resiliently engage the entire wall of the well bore 18. The upper body portion 19 of each stave is laterally narrower by a substantial amount than the lateral width of the end portions 15 and 16 but of a sufficient lateral width to retain adequate strength for maintaining its shape. The lower body portion 20 of each stave is substantially wider than the end portions 15 and 16 and at 21 tapers down to the end portion 16. The actual amount by which the width of portion 20 exceeds the width of the end portions will depend on the extent to which the stave is bowed outwardly since the width of body portion 20 must be adequate to overlap an adjacent stave 14 when the staves are mounted on the collars 11 and 12.

In assembling the multiplicity of staves 14 to the collars 11 and 12, the collars are positioned on an appropriate mandrel for supporting the collars in axial alignment at the appropriate spacing. The staves 14 are positioned on the exterior of the collars to extend longitudinally therebetween with the end portions 15 and 16 of each stave abutting the like end portions of the adjacent staves whereby each stave is properly and positively located with respect to adjacent staves. The wider body portion 20 of each stave interiorly overlaps the next adjacent stave in one circumferential direction of the cement basket 10 and that direction is the direction in which the widened body portion 20 extends from the narrower upper body portion 19. This overlapped relation may be seen in FIGURE 3. The extreme ends of the end portions 15 and 16 of the multiplicity of staves are substantially aligned in a circumferential direction about the collars 11 and 12 and therefore the metal staves are readily joined to the metal collars by a continuous weld bead 22 extending circumferentially therealong. Such welding can be conveniently accomplished either manually or automatically. The entire multiplicity of staves 14 may be temporarily clamped in place on the collars in their proper position before initiating the welding or the staves may be individually and successively positioned on the collars as the welding progresses depending on which method is most convenient.

The cement basket 10 is mounted on the well pipe 13 at the appropriate location therealong in any convenient manner. A typical manner of installation is shown in FIGURE 2 wherein conventional stop collars 25 are mounted on the well pipe 13 above and below the cement basket and spaced a distance from the collars 11 and 12. This spacing of stop collars 25 permits the staves 14 of the cement basket to flex and collapse in operation which results in axial movement of collars 11 and 12 away from each other. In a mounting arrangement of this type the cement basket 10 is "pushed" along in the well bore 18 by the "trailing" collar which will be the upper collar 11 upon downward movement (as shown in FIGURE 2) and the lower collar 12 upon upward movement. As alternatives, one of the collars 11 or 12, but not both, may be welded to the well pipe 13 or to one of the stop collars 25 rather than using the pair of collars 25 if desired under the particular conditions. As thus positioned in the well bore 18, the staves 14 of the cement basket resiliently engage the well bore wall in almost complete surface contact around the entire circumference as shown in FIGURE 3. The presence of gaps between the outer surface of the staves and the well bore wall is minimized by both the thin arcuate cross section of the staves and the fact that all of the staves are overlapped in the same circumferential direction. The upper body portions 19 of the staves are of less width than the center to center spacing of the staves and therefore upwardly facing openings are formed between staves for communicating the interior of the cement basket 10 with the annular space above the cement basket 10. In this manner the cement or other fluid above the cement basket 10 passes into the interior of the cement basket and the fluid pressure from above is applied to the interior of the overlapping lower body portions 20 of the staves outwardly into a firm and substantially fluid type engagement with the wall of the well bore. However, this does not inhibit the upward flow of fluid passed the cement basket 10 when such is desired since by increasing the fluid pressure on the exterior of the lower portion of the cement basket the resiliently flexible staves 14 will be urged inwardly thereby allowing the fluid to pass between the well bore wall and the exterior of the staves. Under all of these conditions the cement basket 10 is relatively immuned to harm or destruction by reason of employing the overlapping and mutually supporting resilient staves and eliminating the use of conventional fabrics, projecting sheet metal leaves and the like which are susceptible to damage.

Figure 6:
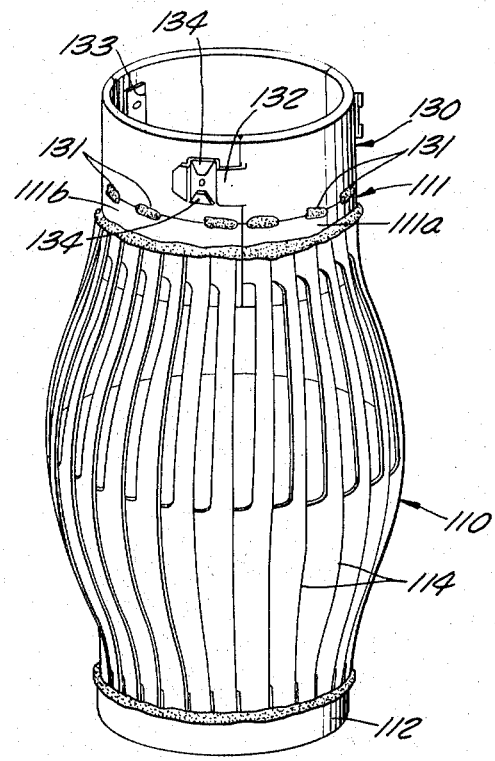
FIGURE 6 is a perspective view similar to FIGURE 1 but illustrating a modified form of the device having a segmented upper collar separable for mounting over a collar.

Referring now to FIGURES 6, 7 and 8, a modified embodiment of the cement basket of this invention is shown. In this cement basket, generally, designated 110, the individual staves 114 and the lower collar 112 may be idetnical to the afore-described staves 14 and lower collar 12, respectively, of cement basket 10. The difference in this cement basket 10 resides in the construction of upper collar 111 with a resultant change in the manner in which the device may be mounted on the well pipe. Upper collar 111 is split into three substantially equal segments, two of which are visible in FIGURE 6 as 111a and 111b, that combine to form a cylindrical collar on which the upper end of the staves are mounted in the afore-described maner. A releasable collar 130 of the same diameter as collar 111 is mounted on the end of colllar 111 by skip welding 131 or if desired collar 130 can be constructed integral with collar 111. Collar 130 is similarly comprised of three segments aligned with the three segments of collar 111. Each of the three segments of collar 130 is provided with a circumferentially extending tongue 132 on one circumferential extremity and a pocket 133 at the other circumferential extremity. Two tabs 134 are punched from each pocket 133 and remain integral with the collar segment. Each tongue 132 has a raised portion 135 for extending over the exterior of the adjacent collar segment, a depressed pad portion 136 of a size and shape for fitting into the pocket 133, and a terminal portion 137 for fitting over the exterior of the collar segment as best shown in FIGURE 8. With the tabs 134 extending radially outwardly from pockets 133 the three segments of collar 130 may be radially separated by forcing the tongues 132 out of the cooperating pockets 133. The staves 114 resiliently urge the segmented collars 111 and 130 toward their normal cylindrical condition but the segmented collars may be forceably separated without damage to the staves. In this manner the basket 110 may be axially slipped on to a casing 113 and by separating the segmented collars 111 and 130 the basket may be slipped over the enlarged diameter of the casing collar 139 or a preinstalled stop collar. The segmented collars 111 and 130 are allowed to collapse and the tongues 132 are appropriately engaged in the pockets 133. The tabs 134 are then closed over the top of pad portion 136 of each tongue 132 to lock the tongues thereby securely locking the segmented collars 111 and 130 in their cylindrical condition. This provides a collar which is separable but of a minimum radial thickness as thus mounted on the well pipe 113 the cement basket 110 is affirmatively located on the pipe and is pulled in either direction in the well bore by engagement of the well pipe collar 139 with either the lower collar 112 or the upper collar 111. This minimizes the destructive forces on the stave 114 as caused by movement of the pipe within the well bore.

Figure 9:
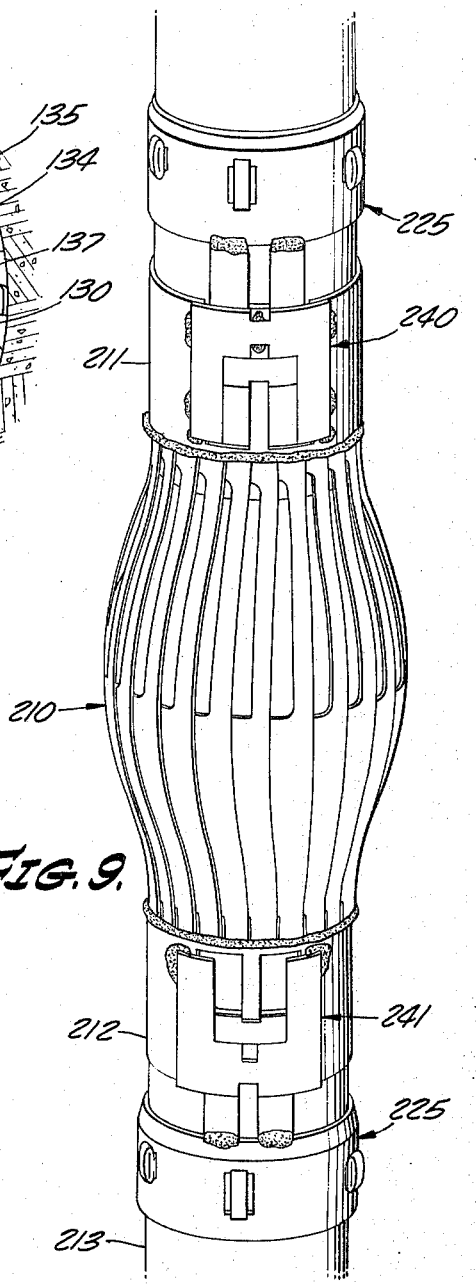
FIGURE 9 is a perspective view of another modified form of the cement basket of this invention employing still another means for securing the basket to the well pipe.

Referring now to FIGURE 9, another embodiment of the cement basket of this invention is shown. Cement basket 210 is substantially identical to afore-described cement basket 110 although the upper and lower collars 211 and 212 are preferably of greater axial length. Also upper and lower collars 211 and 212 are modified to incorporate an interconnecting assembly, generally designated 240 and 241 respectively. Interconnecting assemblies 240 and 241 are in turn connected to conventional stop collars 225 positioned above and below respectively, the collars 211 and 212. The stop collars 225 are adapted to be secured to the well pipe 213 without welding when such is desired. Interconnecting assemblies 240 and 241 and the functions thereof are more thoroughly described in Patent No. 3,200,884 but basically it may be said that they serve to connect the cement basket collars 211 and 212 to the stop collars 225 in a manner whereby the cement basket 210 is "pulled" within the well bore by the leading collar rather than being "pushed" by the trailing collar as depicted in FIGURE 2. Moreover interconnecting assemblies 240 and 241 permit the staves of cement basket 210 to flex inwardly and outwardly without inhibiting the axial movement of collars 211 and 212 necessary to accommodate such flexing.

Thus by this invention there is provided a cement basket of extremely rugged and durable construction which is capable of the heretofore known functions of cement baskets and yet the construction of the cement basket of this invention is the essence of simplicity. In its preferred form shown in FIGURES 1 through 5 the cement basket is comprised of only two different components, that is, a cylindrical collar and the uniquely shaped stave. By combining a pair of such collars and a multiplicity of such staves in this unique manner a highly effective cement basket is formed.

Having fully described my invention it is to be understood that I do not wish to be limited to the details herein set forth but rather my invention is of the full scope of the appended claims.

I claim:

1. In a cement basket for use on a well pipe with a well bore or casing, the combination of; a pair of spaced and aligned collars, a multiplicity of outwardly bowed and resilient staves positioned circumferentially around said collars and extending between and mounted on said collars, each said stave having upper and lower body portions above and below respectively the most outwardly bowed portion of the stave, said upper body portion of each stave having a lateral width substantially less than the lateral center-to-center spacing of said staves, and said lower body portion of each stave overlapping the next adjacent stave to form a barrier for preventing material from passing downwardly through the basket.

2. The cement basket of claim 1 in which a selectively operable stop collar is interconnected to each said collar away from said staves in a manner for limited axial movement for locating the cement basket on the well pipe.

3. The cement basket of claim 1 in which said staves have an arcuate cross-section externally convex for closely conforming to the well bore wall and for structural reinforcement.

4. The cement basket of claim 3 in which one lateral edge of each said stave is longitudinally straight whereby the greater width lower body portion extends in one given direction from the narrower upper body portion and each stave interiorly overlaps the next adjacent stave in that given direction.

5. The cement basket of claim 1 in which each stave has upper and lower end portions engaging the collars of a lateral width equal to the center-to-center spacing of the staves whereby such end portions are in abutting relation for assembly of the staves to the collars.

6. The cement basket of claim 5 in which said stave end portions have circumferentially straight extreme edges which are circumferentially aligned and a continuous circumferential weld along said edges secures said staves to said collars.

7. The cement basket of claim 1 in which the upper of said collars is circumferentially segmented for allowing said collar to be radial spread outwardly to slip over an enlarged diameter on the well pipe.

8. The cement basket of claim 7 in which selectively interconnected means are provided on said collar segments for selectively locking said upper collar in its normal circular condition.

9. In a cement basket for use on a well pipe with a well bore or casing, the combination of; a pair of spaced and aligned collars, a multiplicity of outwardly bowed and resilient staves surrounding said collars and extending longitudinally between and mounted on said collars, each said stave having an upper body portion above and a lower body portion below the most outwardly bowed portion of the stave, each said upper body portion having a lateral width substantially less than and each said lower body portion having a lateral width substantially greater than the lateral center-to-center spacing of adjacent staves, said greater width of each stave extending laterally in only one direction from said narrower upper body portion and all in the same circumferential direction, and said lower body portion of each stave interiorly overlapping the next adjacent stave in the last said circumferential direction for retaining and stopping the material passing downwardly into the basket through the openings formed between the narrow upper body portions of the staves.

10. In a cement basket for use on a well pipe with a well bore or casing, the combination of; a pair of longitudinally spaced and axially aligned upper and lower collars for positioning on the well pipe, a multiplicity of outwardly bowed staves of resiliently flexible material extending longitudinally between said collars for resiliently engaging the well bore, each such stave being of laterally curved cross-section for structural reinforcement and closely conforming to the well bore, each said stave having upper and lower end portions of substantially the same lateral width for mounting on the surfaces of the collars, each said stave end portion substantially abutting the stave end portions of adjacent staves for the entire circumference of the collars to uniformly locate said staves, weld means extending substantially continuously around said collars at the ends of said staves to secure said end portions to the collars, each said stave having upper and lower body portions extending from the most outwardly bowed portion of the stave to said upper and lower end portions respectively, said upper body portion of each stave having a lateral width substantially less than that of the said end portions for forming an open space between adjacent staves to allow material from outside-above the basket to pass downwardly into the basket, said lower body portion of each stave having a lateral width substantially greater than both the width of a said end portion and the lateral center-to-center spacing of all portions of adjacent staves, said greater width of each stave extending laterally in only one direction beyond said narrower upper body portion and all in the same circumferential direction, and said lower body portion of each stave interiorly overlapping the next adjacent stave in the last said circumferential direction for retaining and stopping the material passing downwardly into the basket.

11. The cement basket of claim 10 in which said upper collar is split into at least two circumferential segments, and interlocking means are provided on adjacent circumferential extremities of said collar segments comprising circumferentially extending tongue on one segment with a depressed portion and a pocket in the other segment for receiving said depressed portion and tabs for locking said tongue in said pocket.

References Cited

UNITED STATES PATENTS

| | | | |
|---|---|---|---|
| 2,117,538 | 5/1938 | Baker | 166—202 |
| 2,392,145 | 1/1946 | Hall | 166—202 |
| 2,482,651 | 9/1949 | Burt | 166—202 X |
| 2,602,514 | 7/1952 | Althouse | 166—202 |
| 3,114,422 | 12/1963 | Solum | 166—202 |
| 3,119,451 | 1/1964 | Hall | 166—202 |
| 3,200,884 | 8/1965 | Solum et al. | 166—241 |
| 3,289,768 | 12/1966 | Solum | 166—241 X |

CHARLES E. O'CONNELL, *Primary Examiner.*

D. H. BROWN, *Assistant Examiner.*